United States Patent
Kurichiyath (10) Patent No.: US 7,984,241 B2
(45) Date of Patent: Jul. 19, 2011

(54) CONTROLLING PROCESSOR ACCESS TO CACHE MEMORY

(75) Inventor: Sudheer Kurichiyath, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 438 days.

(21) Appl. No.: 11/492,841

(22) Filed: Jul. 26, 2006

(65) Prior Publication Data

US 2007/0067578 A1  Mar. 22, 2007

(30) Foreign Application Priority Data

Sep. 16, 2005  (IN) ............................ 1313/CHE/2005

(51) Int. Cl.
*G06F 12/00* (2006.01)

(52) U.S. Cl. ........ 711/122; 711/117; 711/118; 711/130; 711/141; 711/145

(58) Field of Classification Search ........................ None
See application file for complete search history.

(56) References Cited

U.S. PATENT DOCUMENTS

| | | | | |
|---|---|---|---|---|
| 5,802,574 A | * | 9/1998 | Atallah et al. | 711/144 |
| 6,131,145 A | * | 10/2000 | Matsubara et al. | 711/137 |
| 6,349,137 B1 | * | 2/2002 | Hunt et al. | 379/265.06 |
| 6,643,745 B1 | * | 11/2003 | Palanca et al. | 711/138 |

FOREIGN PATENT DOCUMENTS

EP  96630011.3 B1  2/1996

OTHER PUBLICATIONS

Edward Dale, A Discussion of the Design Decisions Made in the Intel Itanium Processor, Computer Architecture, Spring 2003, entire document.

* cited by examiner

*Primary Examiner* — Kevin L Ellis
*Assistant Examiner* — Alan Otto (57) ABSTRACT

A plurality of bits are added to virtual and physical memory addresses to specify the level at which data is stored in a multi-level cache hierarchy. When data is to be written to cache, each cache level determines whether it is permitted to store the data. Storing data at the appropriate cache level addresses the problem of cache thrashing.

18 Claims, 7 Drawing Sheets

CONTROLLING PROCESSOR ACCESS TO CACHE MEMORY

This application claims priority from Indian patent application IN1313/CHE/2005, filed on Sep. 16, 2005. The entire content of the aforementioned application is incorporated herein by reference.

BACKGROUND OF THE INVENTION

Cache memory is a standard feature on modern processors, permitting faster access to data as compared to accessing the main memory (RAM). However, in multiprocessor systems, cache coherency is an issue, as cache memory associated with each processor has access to a common memory resource, giving rise to the potential for discrepancies in the data stored in different caches. Multiprocessor systems conventionally guarantee cache coherency using a variety of protocols such as the MESI protocol (Modified: Exclusive: Shared: Invalid). The purpose of such protocols is to ensure that a processor has exclusive access to a memory location for performing a read or write operation.

If two or more processors write to the same memory location, each processor needs to wait for one additional memory cycle, being the cycle that validates and invalidates other processor caches. This potentially creates a 'ping-pong' scenario, so that accessing cached memory becomes slower than uncached memory access. The overheads for ensuring exclusive access on systems such as NUMA (Non-Uniform Memory Access) are even greater. One solution to this problem is to prevent such memory pages from being cached. However, this solution has its own drawbacks. For example, hyper threading processors may share caches, even at the cache level that is closest to the processor.

Another problem in conventional systems which is similar to the ping-pong scenario is that of false cache sharing. This may, for example, occur where different data items are always loaded into the same cache line, but each of two or more processors require concurrent access to the items.

Yet another problem with cache control in conventional systems is that an application's important cache-sensitive data may be overwritten by its own access to other less important data, or by accesses to other data made by less important applications.

BRIEF DESCRIPTION OF THE DRAWINGS

The invention will now be described by way of example only with reference to the drawings in which.

DETAILED DESCRIPTION OF THE INVENTION

According to an embodiment of the disclosure, there is provided a method of controlling processor access to a cache memory level in a multi-level cache hierarchy, comprising determining a cache level attribute for an access operation and controlling access to the cache memory level based on the cache level attribute.

By permitting cache control based on a cache level attribute, fine grain control of the cache level at which data is stored can be achieved, for both single and multiprocessor systems. In a multiprocessor system, this can lead to a reduction in cache thrashing due to concurrent access by different processors. In a single processor system, it can provide for the ability to reserve cache areas for important data and to disallow replacement of important data by data that is less important or only infrequently accessed. The step of controlling access may comprise comparing the cache memory level with a value of the cache attribute and controlling access based on said comparison. Each cache level looks at the value of the cache attribute to determine if it should permit or disallow data to be stored at that level. The cache level attribute may comprise two or more bits attached to a virtual or physical address or may comprise an entry in the page table and TLB associated with a virtual/physical address mapping.

According to another embodiment, there is also provided a method of setting a cache level attribute for controlling processor access to a cache memory level in a multi-level cache hierarchy, comprising determining a cache level attribute for a memory page; and associating the cache level attribute with the memory page.

The step of determining the cache level attribute may include determining which of a plurality of processors require access to the memory page and setting the cache level attribute in dependence on said determination. The method may include setting the cache level attribute in dependence on the importance of a process or on the frequency of access to a process.

According to yet another embodiment, there is further provided a cache memory module comprising cache memory and a cache controller, the cache controller being configured to determine a cache level attribute for an access operation and to control access to the cache memory based on the cache level attribute.

According to still another embodiment, there is still further provided a system for controlling processor access to a cache memory level in a multi-level cache hierarchy, comprising means for determining a cache level attribute for an access operation; and means for controlling access to the cache memory level based on the cache level attribute.

Figure 1:
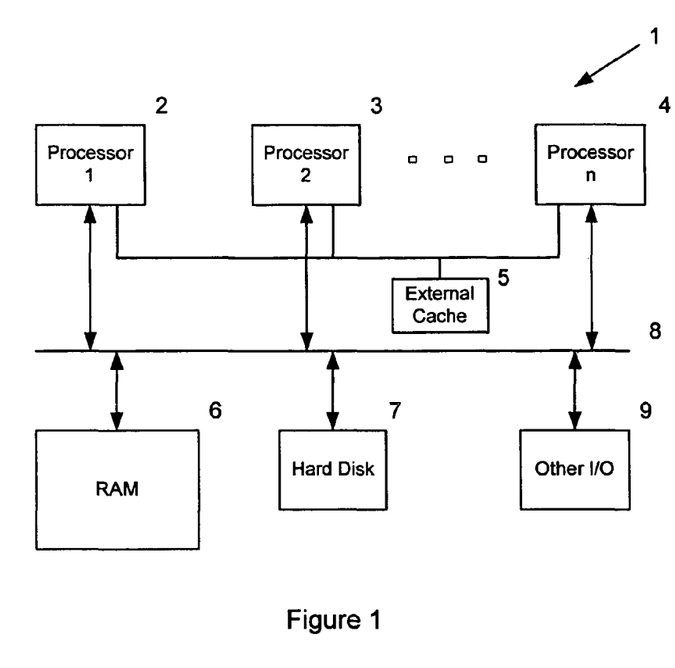
FIG. 1 is a schematic diagram of a conventional multiprocessor system.

FIG. 1 is a schematic diagram of a conventional symmetric multiprocessor system 1 comprising a plurality of processors 2, 3, 4, an external cache 5, main memory 6, for example in the form of dynamic RAM, and a hard disk 7, interconnected by a bus 8. The system typically also includes a variety of other I/O subsystems 9 required for operation of the system, as would be apparent to a person skilled in the art.

Figure 2:
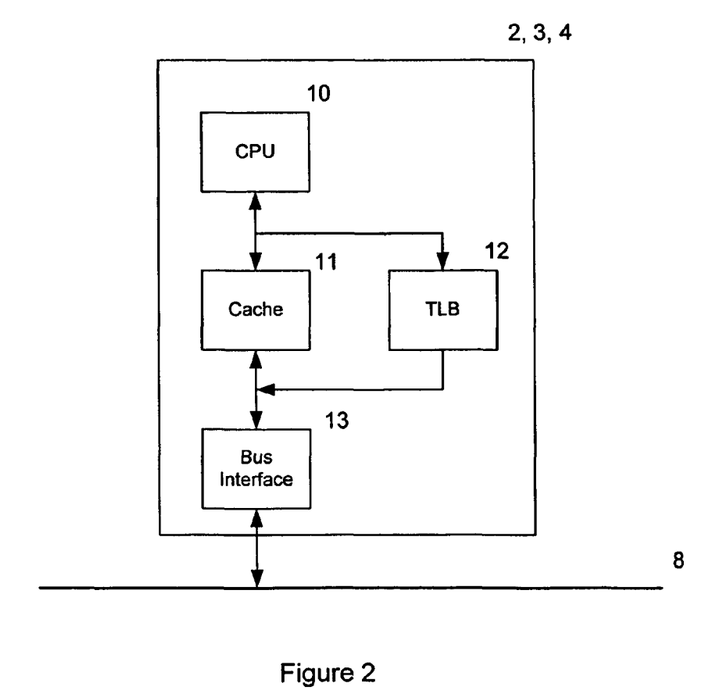
FIG. 2 is an example processor architecture for the processors shown in FIG. 1.

FIG. 2 shows an example processor architecture for each of the processors 2, 3, 4. Each processor 2, 3, 4 comprises a central processing unit CPU 10, an internal cache memory 11, a translation look a side buffer TLB 12 and a bus interface module 13 for interfacing to the bus 8.

Figure 3:
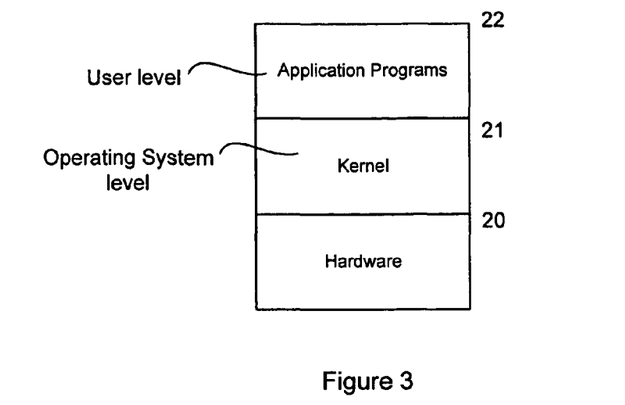
FIG. 3 is a high-level overview of a computer system illustrating the interrelationship between software and hardware.

FIG. 3 is a high-level overview of a computer system illustrating the interrelationship between software and hardware. The system includes a hardware level 20, a kernel 21 and a user level 22. The hardware level 20 includes the hardware system elements shown in FIG. 1, the kernel 21 is the part of the operating system that controls the hardware and the user level 22 includes the application programs that are being run on the computer. Each processor in a multiprocessor system runs one or more processes, which can be defined as programs in execution. Processes in turn generally run as a number of threads, where a thread is an entity within a process that can be scheduled for execution by an operating system scheduler. All threads of a process share its virtual address space and system resources.

The internal and external caches 5, 11, main memory 6 and hard disk 7 shown in FIG. 1 are all capable of storing program instructions and data, generally referred to together as data. The way in which data is transferred between these memories is handled by a memory management system that is explained in more detail below.

Modern operating systems such as the HP-UX™ system operate a virtual memory management system. When a program is compiled, the compiler generates virtual addresses for the program code that represent locations in memory. However, to enable execution of the program by a CPU, the data and instructions of the associated processes or threads of execution within a process must be available to the CPU by residing in the main memory 6, also referred to as the physical memory, at the time of execution. Therefore the virtual addresses must be mapped to physical addresses within the physical memory prior to execution.

Since each process can be allocated a virtual address space irrespective of the availability of physical memory, a virtual memory management system permits the total size of user processes to exceed the size of physical memory. Portions of the virtual address space are mapped to physical memory as required, using a technique known as demand paging.

A page is the smallest unit of physical memory that can be mapped to a virtual address. For example, on the HP-UX™ system, the page size is 4 KB. Virtual pages are therefore referred to by a virtual page number VPN, while physical pages are referred to by a physical page number PPN.

Figure 4:
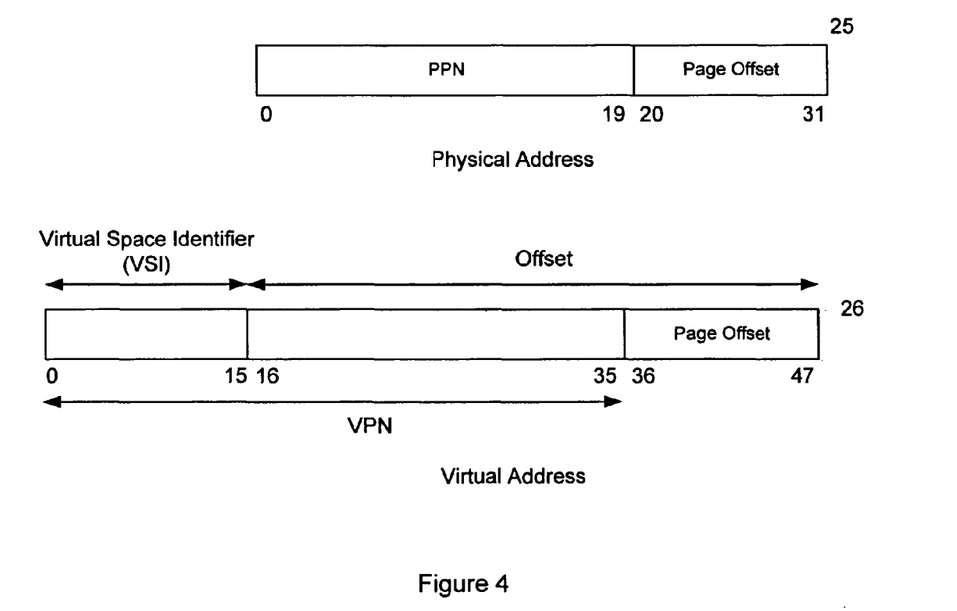
FIG. 4 illustrates the structure of virtual and physical page numbers in a virtual memory management system.

FIG. 4 illustrates the structure of virtual and physical page numbers. For example, a 32 bit physical address comprises a page number (PPN) of 20 bits, and a page offset of 12 bits. The page offset specifies the actual memory location within a 4 KB page. The corresponding virtual address comprises a 16 bit virtual space identifier, and a 32 bit offset. The virtual space identifier and high order 20 bits of the offset together make up the virtual page number (VPN), while the low order 12 bits of the offset specify the page offset, and are conventionally the same as the page offset in the physical address.

Figure 5:
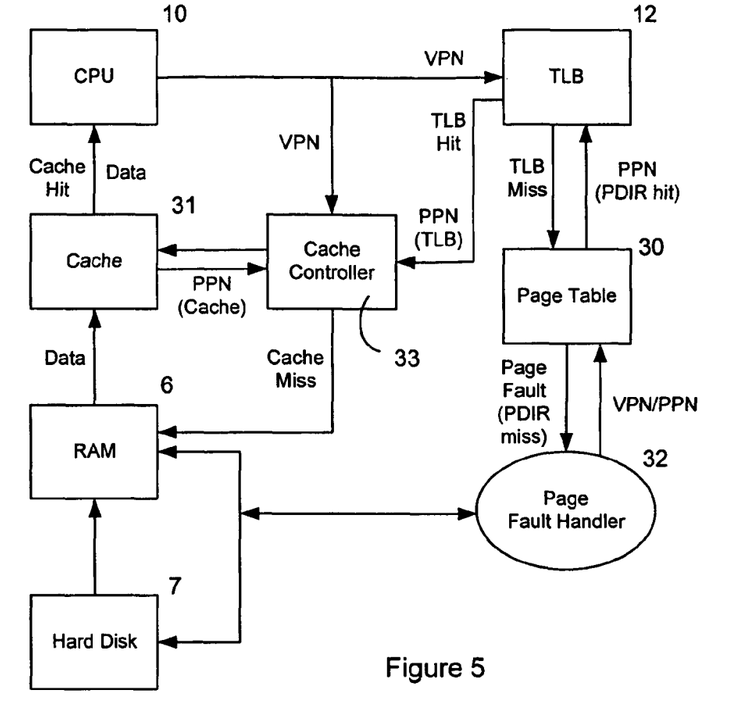
FIG. 5 illustrates a mechanism used to translate between virtual and physical addresses in a virtual memory management system.

FIG. 5 illustrates the mechanism used in an operating system such as HP-UX™ to translate between virtual and physical addresses and to read or write to the cache.

The operating system maintains a table in physical memory 6 referred to as a page directory, or page table 30. This contains a complete listing of all pages currently in physical memory 6 and their corresponding virtual page numbers. The TLB 12 can be considered as a cache of the page table 30 and stores a subset of the mappings in the page table. When a processor 2, 3, 4 wishes to access a memory page, it first looks in the TLB 12 using the virtual page number as an index. If a physical page number is found in the TLB 12, which is referred to as a TLB hit, the processor knows that the required page is in the main memory 6.

If the page number is not found, which is referred to as a TLB miss, the page table 30 is checked to see if the required page exists there. If it does, which is referred to as a PDIR or page table hit, the physical page number is loaded into the TLB 12. If it does not exist, which is generally referred to as a PDIR miss or page fault, this indicates that the required page does not exist in main memory 6, and needs to be brought into memory from the hard disk 7. The process of bringing a page from the hard disk 7 into the main memory 6 is dealt with by a software page handler 32 and causes corresponding VPN/PPN entries to be made in the page table 30 and TLB 12, as is well known in conventional systems.

Access to data in a cache 31 follows similar principles. Cache memory is essentially organised as a number of equal-sized blocks called cache lines for storing data and a cache tag is associated with every cache line, which is used to describe its contents and to determine if the desired data is present. The tag includes a physical page number identifying the page in main memory where the data resides. When the processor wishes to read from or write to a location in main memory, it first checks whether the memory location is in the cache, by comparing the address of the memory location to all tags in the cache that might contain the address.

For example, for a virtually indexed cache 31, a virtual address is used to access a physical page number (PPN (Cache)) stored in the cache 31 via a cache controller 33.

If the physical page number (PPN(Cache)) corresponds to the physical page number generated by the TLB 12 (PPN (TLB)), this means that the required data is available in the cache 31, referred to as a cache hit. In the case of a cache hit, the processor can read or write the data in the cache line.

If the page numbers do not match, a cache miss occurs and the data is loaded into the cache 31 from main memory 6 for subsequent rapid access by the processor. The comparison with the PPN generated by the TLB 12 is required since blocks from many different locations in memory can be legitimately mapped to the same cache location.

Figure 6:
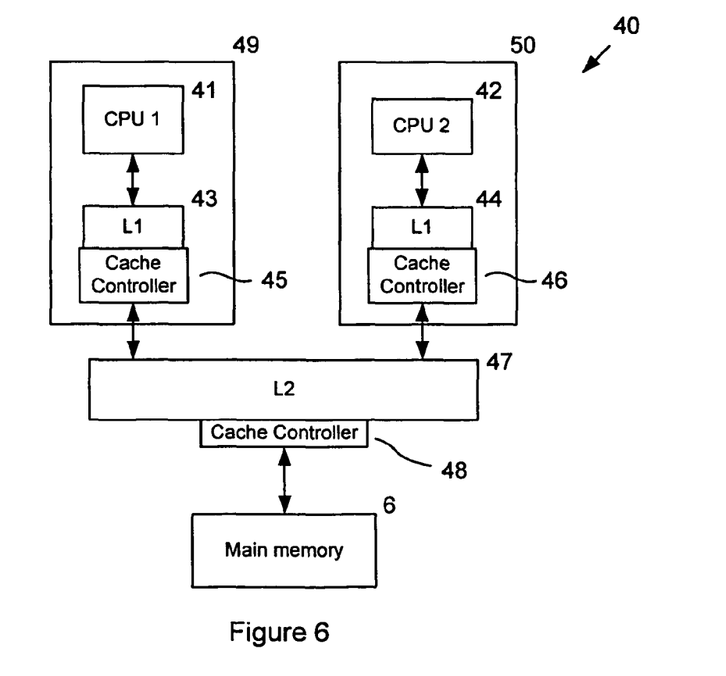
FIG. 6 is a schematic diagram of a dual processor system illustrating a two-level cache hierarchy according to an embodiment of the invention.

FIG. 6 illustrates a dual processor system 40 having a two-level cache hierarchy. The system 40 comprises first and second CPUs 41, 42 each having a cache memory 43, 44, generally referred to as level 1 (L1) or primary cache, meaning that it is closest to the processor and therefore the fastest of the cache memories, not including registers within the CPU (not shown). Each cache is associated with a cache controller 45, 46. A further level of cache memory 47, generally referred to as level 2 (L2) or secondary cache, with a cache controller 48, is shared by both CPUs. While the L1 cache is generally on the same semiconductor chip as the CPU, often referred to as on-chip, the L2 cache may be on- or off-chip. Similarly, the processor modules 49, 50 may be separate or may form part of a single chip dual processor system with or without the L2 cache 47.

The system of FIG. 6 is susceptible to the 'ping-pong' memory issue referred to above, if both CPUs 41, 42 try to cache the same memory location concurrently. This is generally referred to as cache thrashing. The false cache line sharing issue mentioned above is also a form of cache thrashing.

The inventor has appreciated that, in the situation outlined above, cache thrashing can be prevented by storing data at the L2 cache level, rather than at L1. Since the L2 cache is shared between the first and second CPUs 41, 42, cache coherency issues do not arise. A system according to an embodiment of the disclosure provides a mechanism for determining the cache level at which data is to be stored so as to reduce the problem of cache thrashing. The cache level is specified by an attribute, referred to herein as a cache hierarchy hint (CHH).

Table 1 illustrates the possible CHH values and their effect for the cache hierarchy illustrated in FIG. 6. The CHH value is, in this example, stored in two bits.

TABLE 1

| CHH value | Effect |
| --- | --- |
| 0 | Uncached |
| 1 | Cache at L1 |
| 2 | Cache at L2 |

In one example of the technique disclosed, the cache hierarchy hint bits are attached to memory pages.

Figure 7:
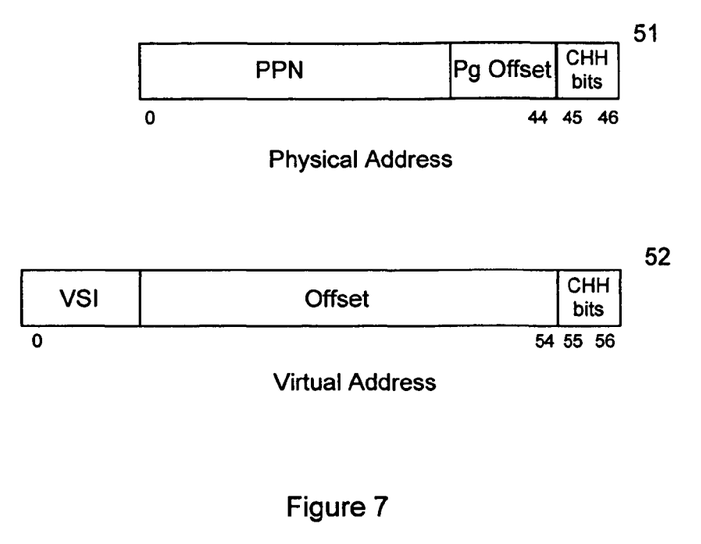
FIG. 7 is a schematic diagram of virtual and physical addresses including cache hierarchy hint (CHH) bits according to an embodiment of the invention.

For example, in a 64 bit system that supports 45 bit physical addressing and a 55 bit virtual address, bits 45 and 46 of the physical address 51 and bits 55 and 56 of the virtual address 52 are used to store the CHH bits, as illustrated in FIG. 7.

Figure 8:
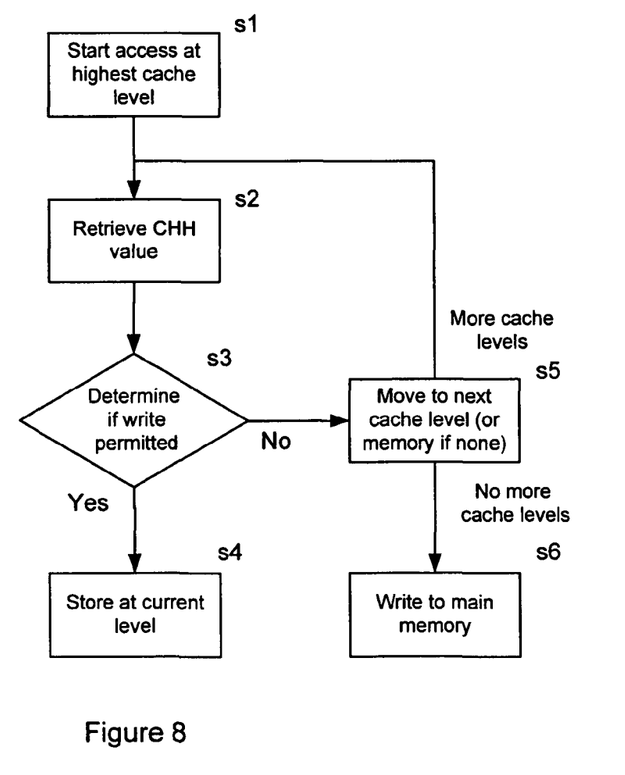
FIG. 8 is a flowchart illustrating a caching protocol for the system of FIG. 6.

A caching protocol for the CHH scheme shown in Table 1 is illustrated in FIG. 8, assuming that a memory page has previously been associated with CHH bits as described above.

When data is to be written to the cache, for example, following a previous cache miss, the write cycle starts at the L1 cache, for example at a first L1 cache 43 associated with the first CPU 41 (step s1). The first L1 cache controller 44 retrieves the CHH value associated with the page to be written by examining the last two bits of the virtual address (step s2). If the CHH value specifies that the data is to be written to the L1 cache (step s3), in this example the value being '1', then the data is stored in the L1 cache (step s4). If writing to the L1 cache is not permitted, the procedure moves to the next cache level (step s5), assuming there are more cache levels. For example, at level L2, the L2 cache controller 48 checks if the CHH value is 2. If it is, the data is stored at level L2 (step s4). If there are no more cache levels (step s5), the data is stored in main memory (step s6). In this example, this would occur if the CHH value is '0'.

The same principle applies to multiple cache levels greater than 2. For example, referring to FIG. 9, first, second, third and fourth CPUs 50, 51, 52, 53 are each associated with an L1 cache 54, 55, 56, 57. First and second CPUs 50, 51 share a first L2 cache 58, while third and fourth CPUs 52, 53 share a second L2 cache 59. All four CPUs share an L3 cache 60. The L3 cache is, for example, implemented on a separate chip from that of the processors. The cache controllers are not shown for clarity.

Figure 9:
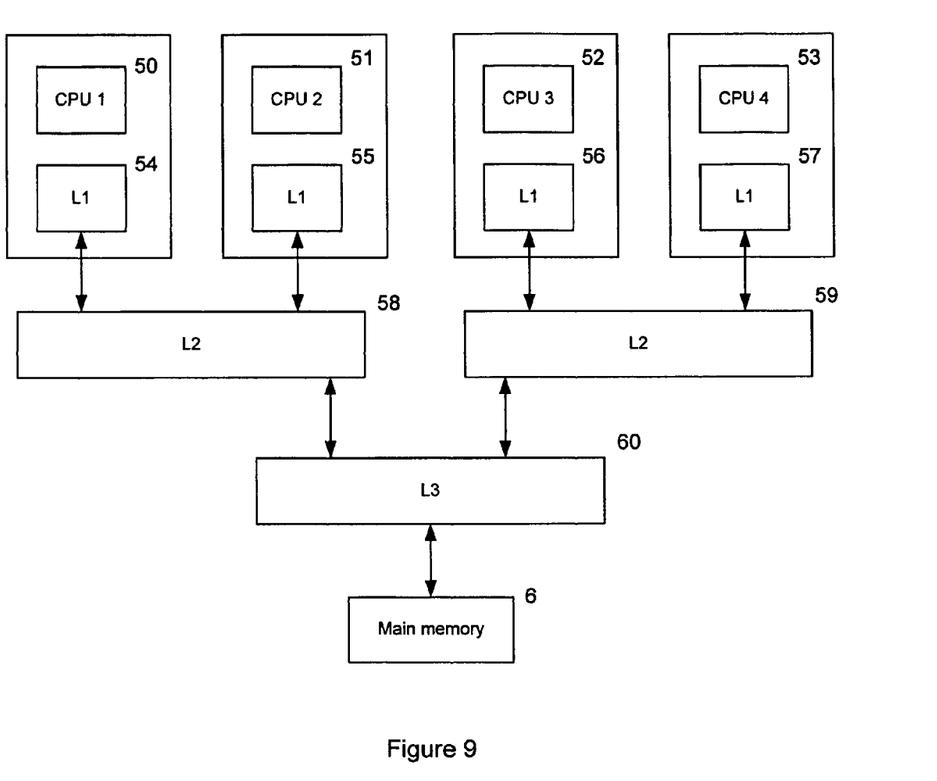
FIG. 9 is a schematic diagram of a system having four processors illustrating a three-level cache hierarchy according to an embodiment of the invention.

The CHH values for the cache hierarchy scheme of FIG. 9 are shown in Table 2 below.

TABLE 2

| CHH value | Effect |
| --- | --- |
| 0 | Uncached |
| 1 | Cache at L1 |
| 2 | Cache at L2 |
| 3 | Cache at L3 |

It will be apparent to a person skilled in the art that the scheme can be extended for any number of cache levels by extending the number of bits used to hold the CHH values. For example, use of three CHH bits will permit up to 7 cache levels.

Figure 10:
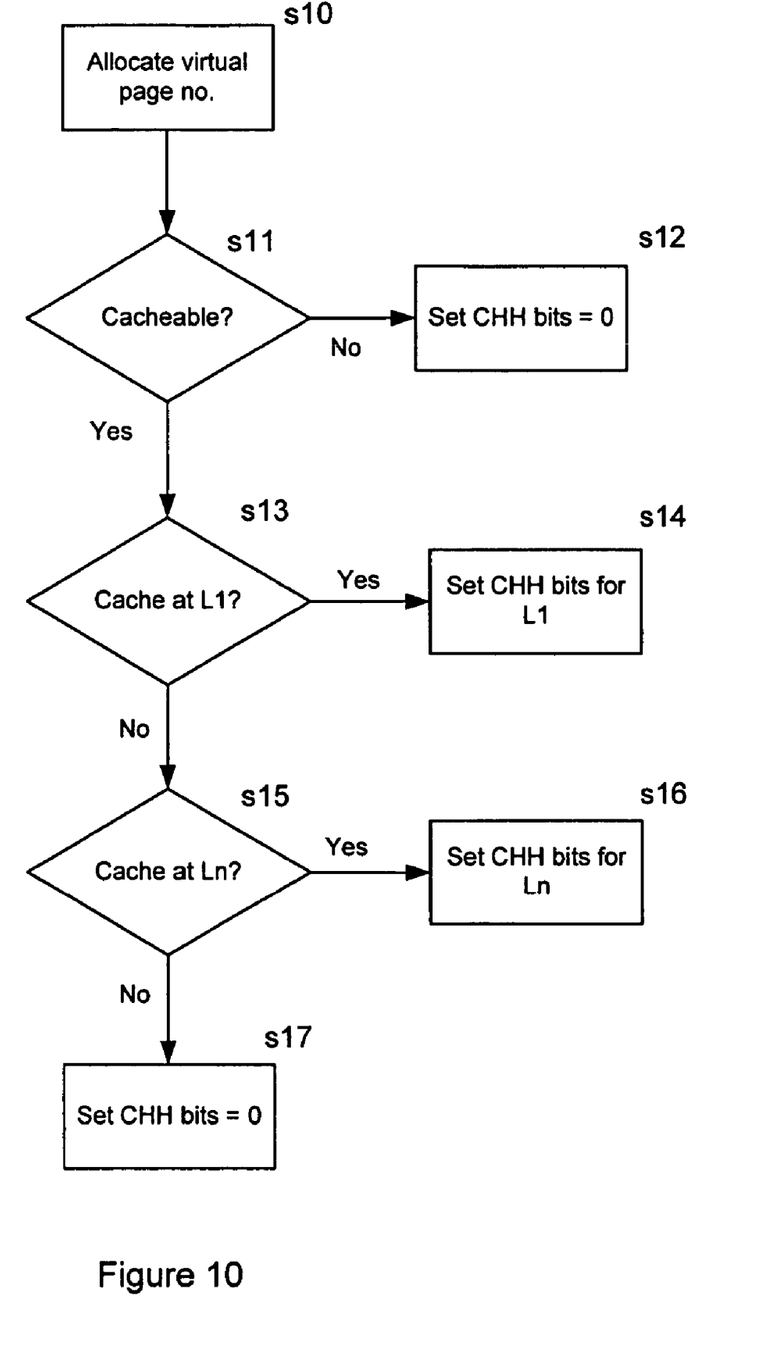
FIG. 10 is a flowchart illustrating the creation of cache hierarchy hint values according to an embodiment of the invention.

The way in which the CHH bits are created is illustrated in FIG. 10. For example, when a page is created for a process, the operating system allocates a virtual page number (step s10). The operating system first determines whether the page is cacheable at all (step s11). For example, if the page is memory mapped I/O, then it is uncacheable and the operating system marks the page as such, for example by setting bits 55 and 56 of the virtual page number as '00' (step s12). If the page is cacheable in principle, then the operating system determines whether the page is in some way eligible for caching at the highest level, for example if it is a stack page or a private page such as a private processor or thread data structure page (step s13). If a page corresponds to a stack of a thread, the page is exclusively accessible to the processor on which the thread is running, and should therefore be cached at the primary cache level L1 for that processor. In this case, the operating system marks the page as being cacheable at the highest level (L1) (step s14), by setting bits 55 and 56 of the virtual page number to '01'. If the page is not important enough to be marked for the L1 cache, the operating system may apply some other criteria for cacheability at a lower level (step s15). If these other criteria are met, for example if the operating system scheduler has any hints that, for instance, a set of co-operating threads that access a shared page can only run from the first or second CPUs 50, 51, then the page is marked for the L2 cache by setting bits 55 and 56 to '10', corresponding to a value of 2 (step s16). A similar process is implemented for all other cache levels Ln. Ultimately, if the operating system decides that the page is not to be cached at any level, the CHH bits are set to 0 (step s17), the same result as for step s12.

Figure 11:
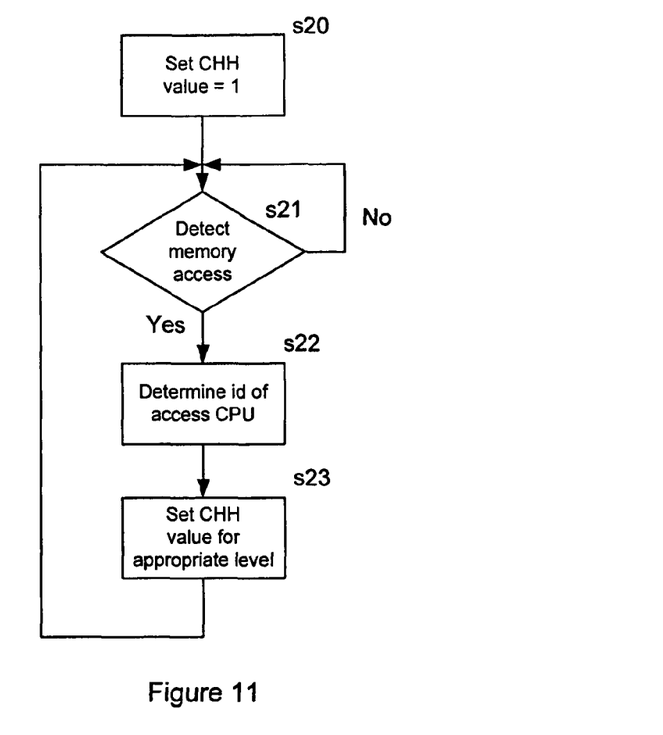
FIG. 11 is a flowchart illustrating an example of dynamic modification of cache hierarchy hint bits according to an embodiment of the invention.

In another example illustrated in FIG. 11, the setting of CHH values is done dynamically rather than statically at the time the page is created. For example, when a first thread is created from the first CPU 50, the operating system initially sets all CHH page values to '1' to ensure L1 caching (step s20). At a later point in time, a second thread from another CPU starts accessing the memory area being used by the first thread. The operating system detects this access (step s21), identifies the CPU running the thread (step s22) and changes the CHH values of the relevant pages as appropriate (step s23). For example, where the second thread is associated with the second CPU 51, the operating system changes the CHH value to '2' to ensure L2 caching. Similarly, the values can be changed to '3' if the operating system notices that accesses by the third or fourth CPUs 52, 53 create cache thrashing.

In another example, the cache hierarchy is associated with a single processor. In this case, the memory pages allocated to an important process can be associated with a higher level cache, for example L1, while pages that are associated with less important processes are associated with a lower level cache, for example L2 or L3. The system can therefore prevent data associated with an important process from being replaced in the cache by data associated with less important processes, or processes that will be accessed much less frequently.

Figure 12:
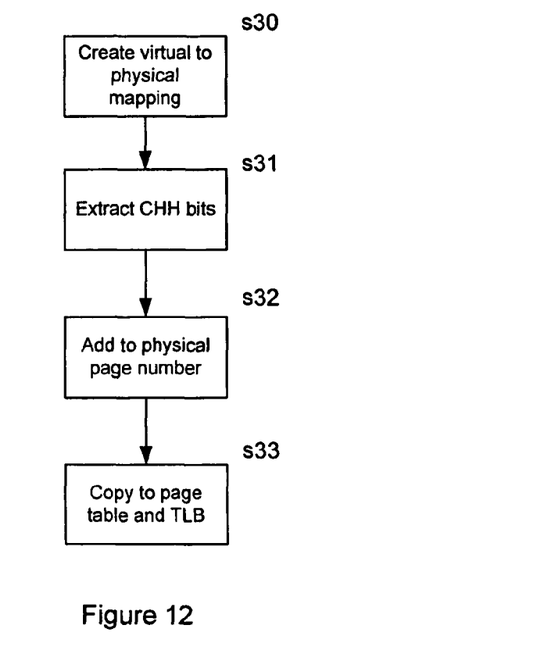
FIG. 12 illustrates the way in which the cache hierarchy hint bits in the virtual address are transferred to the physical address according to an embodiment of the invention.

FIG. 12 illustrates the way in which the CHH bits in the virtual address are transferred to the physical address. When a process is brought into memory for execution, the kernel 21 creates a mapping between the virtual addresses of the pages allocated to the process and the physical addresses of the process pages in memory (step s30). The kernel 21 extracts the CHH bits from the virtual page number (step s31) and adds them to the physical page number (step s32). The virtual page number/physical page number mapping is then copied to the page table 30 and the TLB 12 in a conventional way (step s33).

An algorithm for inserting the translations is set out below in pseudo-code:

```
Insert Translation(Virtual_Address, Physical_Address)
Begin
   Virtual_Page_No=Virtual_Address/Page_Size
   CHH_Value = Extract Bits 55 and 56 from Virtual_Address
   New_Physical_Address = Physical_Address
   Replace bits 45 and 46 of New_Physical_Address with the bits
     contained in CHH_Value
   New_Physical_Page_No=New_Physical_Address/Page_Size
   Insert <Virtual_Page_No, New_Physical_Page_No) into Page Table/
     TLB
End
```

Although the above describes making the CHH values part of the physical address, it will be appreciated that, where the cache is virtually indexed, as illustrated for example in FIG. 5, the CHH values do not need to be part of the physical address, as the CHH value can be extracted from the virtual address. However, making the CHH values part of the physical address extends the inventive scheme to many different types of system, including those based, for instance, on physically indexed or physically tagged caches.

The occurrence of cache misses on previously accessed data can help the operating system to decide whether to downgrade the CHH value of a page or not.

For example, application profilers that are usually bundled with operating systems can help to assess various application performance bottlenecks including cache misses.

Profiler data available while running applications under the control of profilers can contain cache misses at various levels. Some profilers are capable of identifying the memory locations that triggered cache misses. Based on this data, analysis can show whether the memory locations experienced cache thrashing because of a false cache hierarchy issue, i.e. because of data caching at the incorrect cache level. If cache misses are a result of false cache hierarchy problems, then one solution is to change the program source code and adjust the CHH value. Another approach is to change the CHH value on-the-fly. Algorithms to implement static and dynamic CHH adjustment are given below.

For example, the operating system uses the algorithm below to dynamically adjust the CHH values for pages in the address range passed to it, to correspond to the CHH value of the required cache level.

```
Algorithm Change_CHH(Range_of_address, CHH_val)
Begin
   For Every Virtual Page in the Range_of_address
   Begin
      Insert CHH_val bits into Virtual address
      Insert CHH_val bits into Physical address
      Modify TLB/Page Table entries
      Invalidate Caches if required so that Caching is done with respect to
         CHH_val
   End
End
```

Cache invalidation may be required to purge cached data from higher level cache when CHH_val is set to indicate caching in a lower level cache.

The above description sets out the way in which the operating system may implicitly deal with allocation of cache based on a cache level attribute. In another example of the disclosure, a programmer is able to explicitly provide cache level attributes at memory allocation time, so providing for static adjustment of CHH values. For example, a memory allocation routine such as malloc( ) can be modified to pass CHH values. So a prototype C function would look like:
void*malloc(int size, int chh)
where chh is an integer holding the CHH value.

As above, the kernel 21 would mark its physical page with the passed CHH values at the time of creating a mapping for this virtual address.

Similarly, once memory is allocated, an API would be available to modify existing CHH values, in a form such as:
int set_cache_hierarchy_hint(void*start_address, int size, int new_chh)

While examples of the disclosure have been described using a particular scheme for setting CHH values to correspond to cache levels, any scheme which maps CHH values to cache levels could be used. For example, in a two bit system, '11' could indicate caching at the highest level, namely L1, '10' for caching at level L2, and '01' for caching at level L3. All other possible permutations are also encompassed.

The technique disclosed has been primarily described in terms of the CHH bits being attached to memory pages, either using unused or reserved bits of physical and virtual addresses or using extra bits added to the physical or virtual address. In other examples of the technique disclosed, the CHH bits are not attached to the memory pages but are accessible by the cache levels in other ways. For example, the CHH bits are stored into reserved bits of the page table and TLB, rather than forming part of the address itself.

While examples of the technique disclosed have primarily being described with reference to multiprocessor systems, the technique is applicable to single processor systems, where it permits fine grain control of the cache level at which data is to be cached.

Other embodiments or modifications to the above embodiments falling within the scope of the appended claims would be apparent to the skilled person.

The invention claimed is:

1. A method of dynamically controlling processor access to a cache memory level in a multi-level cache hierarchy, comprising:
   determining a cache level attribute for an access operation by at least one of a plurality of processors during runtime using a processor, wherein said cache level attribute comprises a plurality of bits attached permanently to a virtual address and/or a physical address of data and said determination comprises:
      determining a cache level at which data is to be cached upon creation of the virtual address, wherein the step of determining the cache level includes:
         determining which of the plurality of processors require access to data; and
         setting the cache level in dependence on said determination; and
      generating the cache level attribute corresponding to the determined cache level; and
   dynamically controlling processor access to the cache memory level based on the cache level attribute.

2. A method according to claim 1, wherein the step of controlling access comprises comparing the cache memory level with a value of the cache attribute and controlling access based on said comparison.

3. A method according to claim 2, wherein the value of the cache level attribute specifies the cache level at which data is to be stored.

4. A method according to claim 3, comprising permitting data to be written to the cache memory level if the cache level attribute specifies that the data is to be stored at the cache memory level.

5. A method according to claim 3, comprising preventing data from being written to the cache memory level if the cache level attribute does not specify that the data is to be stored at the cache memory level.

6. A method of determining the cache level attribute for controlling processor access to a cache memory level in a multi-level cache hierarchy as claimed in claim 1, comprising:
determining the cache level attribute for a memory page; and
associating the cache level attribute with the memory page.

7. A method according to claim 6, wherein the step of determining the cache level attribute for a memory page includes:
determining which of the plurality of processors require access to the memory page;
and setting the cache level attribute in dependence on said determination.

8. A method according to claim 6, comprising setting the cache level attribute in dependence on the frequency of access to a process and/or importance of a process.

9. A method according to claim 1, comprising writing the attribute to reserved bits in the address.

10. A method according to claim 6, comprising changing the cache level attribute associated with a memory page.

11. A method according to claim 10, comprising changing the cache level attribute based on an assessment of cache misses associated with an application.

12. A method according to claim 10, further comprising invalidating each of a plurality of cache levels associated with the memory page.

13. A cache memory module comprising cache memory and a cache controller, the cache controller being configured to:
determine a cache level attribute for an access operation by at least one of a plurality of processors during runtime, wherein said cache level attribute comprises a plurality of bits attached permanently to a virtual address and/or a physical address of data and said determination comprises:
determining a cache level at which data is to be cached upon creation of the virtual address, wherein the step of determining the cache level includes:
determining which of the plurality of processors require access to data; and
setting the cache level in dependence on said determination; and
generating the cache level attribute corresponding to the determined cache level; and
dynamically control processor access to the cache memory based on the cache level attribute.

14. A system for controlling processor access to a cache memory level in a multi-level cache hierarchy, comprising:
a plurality of processors;
a main memory;
means for determining a cache level attribute for an access operation by at least one of the plurality of processors during runtime, wherein said cache level attribute comprises a plurality of bits attached permanently to a virtual address and/or a physical address of data and said means for determining comprises:
means for determining a cache level at which data is to be cached upon creation of the virtual address, wherein means for determining the cache level includes:
determining which of the plurality of processors require access to data; and
setting the cache level in dependence on said determination means for generating the cache level attribute corresponding to the determined cache level; and
means for dynamically controlling processor access to the cache memory level based on the cache level attribute.

15. A system according to claim, 14 including a single processor and/or multiple processors for accessing the cache memory levels.

16. A system according to claim 14, further comprising means for setting the cache level attribute.

17. A system according to claim 16, wherein the setting means includes:
means for determining a cache level at which data is to be cached; and
means for generating a cache level attribute corresponding to the determined level.

18. A method of dynamically controlling processor access to a cache memory level in a multi-level cache hierarchy, comprising:
determining a cache level attribute for an access operation by at least one of a plurality of processors during runtime using a processor, wherein said cache level attribute comprises a plurality of bits attached permanently to a table that relates virtual addresses and physical addresses of a memory page of data and said determination comprises:
determining a cache level at which data is to be cached upon creation of the memory page, wherein the step of determining the cache level includes:
determining which of the plurality of processors require access to data; and
setting the cache level in dependence on said determination; and
determining the cache level attribute corresponding to the determined cache level; and
dynamically controlling processor access to the cache memory level based on the cache level attribute.

* * * * *

UNITED STATES PATENT AND TRADEMARK OFFICE
CERTIFICATE OF CORRECTION

| | |
|---|---|
| PATENT NO. | : 7,984,241 B2 |
| APPLICATION NO. | : 11/492841 |
| DATED | : July 19, 2011 |
| INVENTOR(S) | : Sudheer Kurichiyath |

It is certified that error appears in the above-identified patent and that said Letters Patent is hereby corrected as shown below:

In column 10, line 24, in Claim 15, delete "claim, 14" and insert -- claim 14, --, therefor.

Signed and Sealed this
Fifteenth Day of January, 2013

David J. Kappos
*Director of the United States Patent and Trademark Office*